United States Patent Office 3,788,944
Patented Jan. 29, 1974

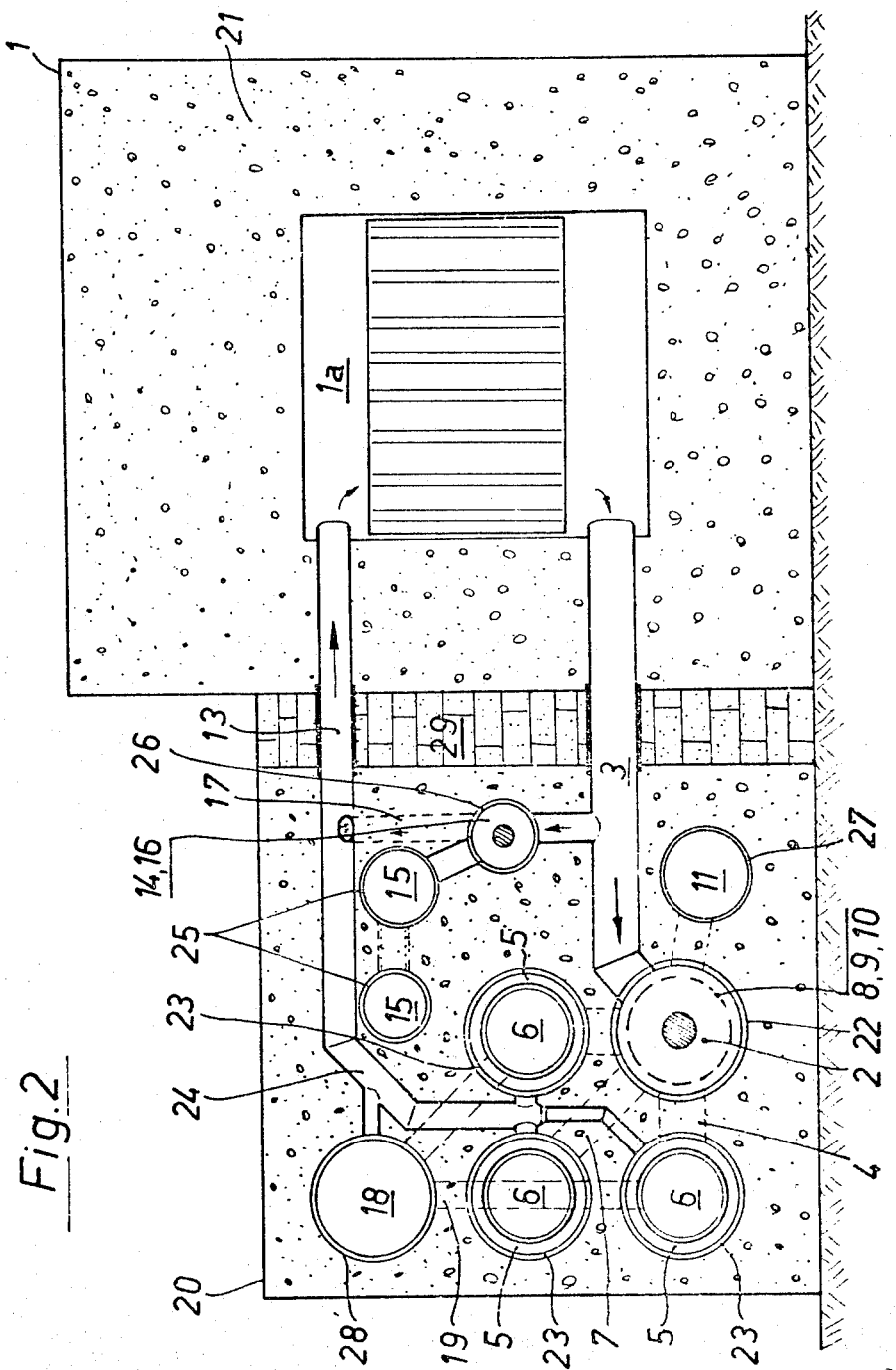

3,788,944
NUCLEAR POWER PLANT HAVING A CLOSED GAS COOLING CIRCUIT
Wilfried Stracke, Oberehrendingen, and Max Zimmermann, Untersiggenthal, Switzerland, assignors to Aktiengesellschaft Brown, Boveri & Cie., Baden, Switzerland
Filed Mar. 8, 1971, Ser. No. 122,019
Claims priority, application Switzerland, Mar. 9, 1970, 3,395/70
Int. Cl. G21c *13/00*
U.S. Cl. 176—60                                    4 Claims

ABSTRACT OF THE DISCLOSURE

In a nuclear power plant of the type having a closed gas coupling circuit, a high temperature reactor is enclosed by one concrete pressure structure; enclosed by another concrete structure separate from and adjacent to the reactor are the related operating components of the power plant such as turbine and compressor units, coolers, heat exchangers, etc., and the housing structures of these individual operating components, such as those which enclose and support the guide blading of the turbo-machines (turbines and compressors), as well as all interconnecting pipe lines and the pipe lines to and from the reactor serve as lost i.e. cast in forms around which concrete is poured on the construction site thereby to form a machine block. The drive shaft from the turbine projects outwardly from the machine block for connection to the electric generator.

---

Figure 1:
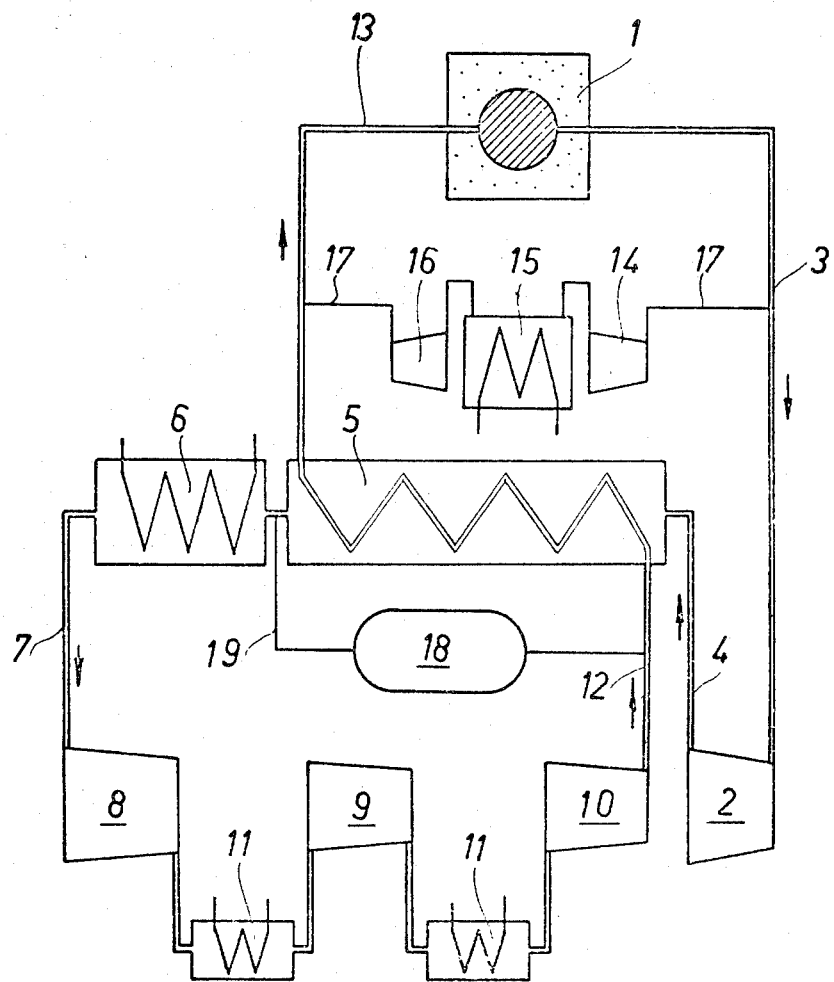

The present invention relates to a nuclear power plant provided with a closed cooling circuit, the plant including at least one high-temperature reactor located within a pressure vessel made of concrete, a gas turbine set including a heat exchanger, compressor pre- and intermediate cooler and lines carrying the propellant gas between the machines and apparatus and the reactor pressure vessel.

A nuclear power plant must meet very rigid requirements regarding safety of the individual components, since even minor damages can result in radioactive contamination or irradiation of the surrounding. It is therefore necessary to shield the plant in such manner that maximum protection against radiation and also the escape of pressure gas is achieved in order to prevent contamination of the surroundings.

Nuclear power plants operated with nuclear energy are known which take these reqirements into account and where the turbine and the machines and apparatus arranged in the gas circuit together with the reactor core are located within a concrete pressure vessel made in a single piece, since concrete pressure vessels of this type are considered sufficiently safe in reactor engineering.

Another embodiment is characterized by a so-called partially-integrated installation of the turbine and of the auxiliary units, where the high-pressure carrying machine and apparatus parts are included in the concrete vessel for the reactor core, while the low-pressure stages of the machines and apparatus are provided with pressure housings made from steel.

Both solutions have the same disadvantage in that the technical construction of the charging and regulating devices of the reactor core is extremely complicated, which is due to the limited space. Moreover, the accessibility is reduced by the position of the machines and apparatus in relation to the reactor core.

Furthermore, due to the different requirements of the reactor pressure vessel, on the one hand, and the machine and other apparatus parts, on the other hand, a difference can be expected from the beginning in the dimensions of the cross sections of the concrete pressure vessel.

If the integrated solution is used, the wall thicknesses of the concrete pressure vessel are so increased that an economic production is no longer justifiable.

The above solutions show, therefore, that it is not possible to effect an optimization of the pressure vessel comprising all the machines, apparatus and the reactor core in a technically and economically satisfactory manner. Furthermore, the homogeneous prestressing of the concrete is reduced to a minimum by the installation of the machines and apparatus in the wall of the pressure vessel enclosing the reactor core.

The partially integrated solution has the disadvantage that a pressure- and explosion-proof container, in addition to the concrete pressure vessel for the reactor core and the high-pressure parts of the machines is required, which is known as the "outer barrier." The latter encloses the machine- and apparatus parts outside the pressure vessel and the pressure container of the core itself, which precludes any possible release.

The principal objective of the present invention is to avoid the above-mentioned disadvantages and to ensure a simple technical construction of the explosion-proof and radiation-proof housings of a nuclear energy plant.

The problem according to the invention is solved in that the reactor core itself is enclosed by one concrete pressure structure; enclosed by another concrete structure separate from and adjacent to the reactor are the related operating components of the power plant such as turbine and compressor units, coolers, heat exchangers, etc. The outer housing structures of these individual operating components, such as those which enclose and support the guide blading of the turbomachines (turbines and compressors), as well as all interconnecting pipe lines and the pipe lines to and from the reactor serve as lost i.e. cast-in forms around which concrete is poured on the construction site thereby to form a machine block. The drive shaft from the turbine projects outwardly from the machine block for connection to the electric generator.

This eliminates the need for providing a separate shell structure within which the various operating components are placed, the shell being thereafter embedded in concrete.

One advantage of the invention results from a clear separation of the reactor pressure vessel from the other machinery and related apparatus, so that a simple construction of a homogeneously prestressed concrete pressure vessel for the reactor core can be realized without any difficulty.

This permits, furthermore, one to adapt the reactor pressure vessel only to the requirements of the reactor core, which results in smaller wall thicknesses and a technical simplification, which also has economical advantages.

The separated out operating components block need be laid out only for the requirements of the apparatus and machines, which results in a more compact arrangement of the gas lines and also permits short gas lines between the various apparatus and machines. Another advantage is that the parts which are subject to wear, also those which require attendance, are made accessible and replaceable in a simple manner.

This advantage is particularly apparent when it is not possible to come close to the circuit components arranged in the reactor pressure vessel because of the radiation effects.

The foregoing as well as other objects and advantages inherent in the invention will become more apparent from the following detailed description of one suitable embodiment of the improved reactor and closed cooling circuit and the accompanying drawings wherein:

FIG. 1 is an illustration of the closed cooling gas circuit of the reactor in schematic form; and FIG. 2 is a view in section through the reactor pressure vessel and the adjacent machine block.

With reference now to FIG. 1, the gas cooling circuit which is depicted shows the high-temperature reactor 1 the gas chamber 1a of which is connected to a gas turbine 2 through a gas line 3. Gas discharged from turbine 2 flows through line 4 to and through a recuperative heat exchanger 5 and thence to and through an after-connected pre-cooler 6. Pre-cooler 6 is fed, for example, with pressurized water for cooling. After leaving pre-cooler 6, the gas current flows through pressure line 7 to and through the cascaded compressor stages 8, 9 and 10, intermediate coolers 11 being provided between the various stages, i.e. between 8 and 9, and between 9 and 10. After leaving the last compressor stage 10, the cooling gas now at high pressure flows through line 12 to and through heat exchanger 5 and is then returned to the high-temperature reactor 1 through line 13.

An auxiliary machine set consisting of a gas turbine 14, cooler 15 and a compressor 16 is arranged in a by-pass line 17 between the return line 13 and the discharge line 3 for the cooling gas from the high-temperature reactor to remove the remaining heat.

Several by-pass lines are also provided to regulate the temperature, pressure and amount of gas of the cooling gas circuit, but they have not been included in the drawing so as not to complicate the circuit diagram. Only the pressure level regulating container 18, which is arranged in another by-pass line 19, has been included in the diagram because of its location. Line 19 extends between line 12 and the connecting line between heat exchanger 5 and pre-cooler 6. The valves required for the regulation have likewise been omitted in the interest of simplification.

FIG. 2 illustrates, in section, an embodiment of the nuclear power plant and closed cooling circuit in accordance with the circuit arrangement shown schematically in FIG. 1. In this view, the machine and apparatus block 20 made from prestressed concrete, and the adjacent reactor pressure vessel structure 21, also made from prestressed concrete can be recognized as the main components. The gas chamber 1a of the nuclear reactor 1 is connected through gas discharge line 3 into turbine 2 which is arranged within the block structure 20 inside of a receiving tube 22 which constitutes the outer housing for the turbine. Tube 22 is advantageously so designed that it serves, on the one hand, as the guide vane support as well as a skin or sheath sealing the turbine 2 and, on the other hand, as a lost i.e. cast-in form around and in contact with which the concrete block structure 20 is poured on the construction site. The drive shaft from the turbine projects outwardly from one side of the concrete block structure 20 for connection to the electric generator.

After giving off its energy in turbine 2, the gas arrives through connecting line 4 in heat exchanger 5. The latter is sub-divided into several individual operating sections, each spaced from the other within the block structure 20, and the corresponding sections of pre-cooler components 6 are arranged behind their respective heat exchanger sections. Shells or mantles 23 provide outer housings for these units and function, as in the case of the receiving tube 22 for turbine, as cast-in forms and sealing sheaths when embedded in the mass of concrete.

After the gas has given off its heat in the heat exchangers 5 and pre-coolers 6, the gas pressure is increased again by means of the compressor stages arranged co-axially with turbine 2, and at least a part of the increased temperature is reduced by the intermediate coolers 11 arranged in their tubular housings 27 which also serve as sealing sheaths for these units and as cast-in forms when the concrete block structure is poured. Preferably, the rotors of the cascaded compressor stages 8,9 and 10 are located within an extension of the same outer guide vane housing 22 of the gas turbine 2. This enables the turbine and compressor machines to be combined in a co-axial arrangement thus providing simpler regulation and access for servicing and or exchange of their rotors and guide blading structures.

The cooling gas is subsequently introduced again in the nuclear reactor 1 by means of the collecting pipe lines 24 from the various heat exchanger sections 5 which are manifolded into the final gas pipe line 13 that leads back to the reactor. Pipe lines 24 and that part of line 13 within the block structure 20 are likewise part of the lost form system.

Between the gas discharge line 3 from the reactor 1 and the gas feed line 13 is arranged an auxiliary heat elimination system 14-16 which can be separated off from the main gas flow circuit by means of stop valves or similar means, not illustrated. This auxiliary heat elimination system is installed in the same manner as the principal circuit with the block structure 20 and includes a turbine 14 and compressor set 16 and an intermediate cooler 15 which is sub-divided and arranged in separate receiving tubes 25. The compressor 16 and turbine 14 are arranged in co-axial relation in a common receiving tube 26. The receiving tubes 25, 26 likewise serve as the guide vane support housings for the turbo-machines and also as sealing sheaths and are cast-in when the block structure 20 is poured.

The pressure level container 18 for regulation of the pressure is provided with a tubular housing or mantle 28 which is connected through lines 19 with the compressor receiving tube 22 and tubular mantle 23 of heat exchanger 5.

The gas discharge line 3 and gas feed line 13 which respectively constitute the only connections between the concrete reactor pressure structure 21 and the block structure 20 must be so designed that they are shielded against radiation and also prevent the escape of gas. This can be achieved in a simple manner, as shown in FIG. 2, in that the lines 3 and 13 are clad with concrete parts 29 so that a radiation and explosion proof sheathing is obtained.

In order to further meet these requirements, it is necessary to produce closures, not illustrated, of the receiving tubes 22, 23, and 25-28 at the side faces of the concrete block structure 20, using double covers in known manner.

The connecting lines 3 and 13 between reactor pressure vessel 21 and block structure 20 can be designed in any other form. This can be achieved, for example, by a double mantle housing of steel, where the outer and inner housings are dilateable.

Another possibility is to lead the connecting lines from reactor pressure vessel 21 to the concrete block structure 20 through a common plate at the bottom, or through a common foundation.

We claim:

1. A nuclear power plant having a closed gas cooling circuit, a high temperature reactor enclosed within a first reinforced concrete structure, a second reinforced concrete structure separate from and adjacent to said reactor-enclosing concrete structure and in which are located coupled turbine and compressor machines and related operating components including coolers and heat exchangers, said turbine and compressor machines each including a cylindrical guide vane support which also constitutes the housing for the machine and said related operating components likewise including housings therefor, all of said housings together with all interconnecting pipe lines and gas discharge and feed lines to and from said reactor in said first concrete structure serving as forms around and in contact with which said second concrete structure is cast, all of said cast-in housings extending to the side of said second concrete structure to permit access to said turbine and compressor machines and the related operating components for servicing.

2. A nuclear power plant as defined in claim 1 wherein the gas discharge and gas feed lines between said first and second concrete structures each consist of a ductile concrete-clad tube.

3. A nuclear power plant as defined in claim 1 and which further includes an auxiliary turbo-machine set comprising coupled turbine and compressor machines and an intermediate cooler therebetween, the housings of the turbine and compressor machines which serve as support structures for the guide vanes thereof and the housing for said intermediate cooler, and a by-pass pipe line extending between said lines extending to and from said reactor also serving as forms around and in contact with which said second concrete structure is cast.

4. A nuclear power plant as defined in claim 1 wherein one of said operating components is a pressure level regulator located in a by-pass pipe line around said heat exchanger, the housing of said pressure level regulator and said by-pass pipe line also serving as forms around and in contact with which said second concrete structure is cast.

References Cited
UNITED STATES PATENTS

| | | | |
|---|---|---|---|
| 3,544,425 | 12/1970 | Shaw et al. | 176—87 |
| 3,371,017 | 2/1968 | Coast et al. | 176—87 |
| 3,359,175 | 12/1967 | Arthur et al. | 176—87 |
| 3,607,636 | 9/1971 | Nageler et al. | 60—59 T |
| 3,444,038 | 5/1969 | Schabert | 176—87 |
| 3,663,364 | 5/1972 | Thompson et al. | 176—87 X |

REUBEN EPSTEIN, Primary Examiner

U.S. Cl. X.R.

60—59 T; 176—87